Figure 1:
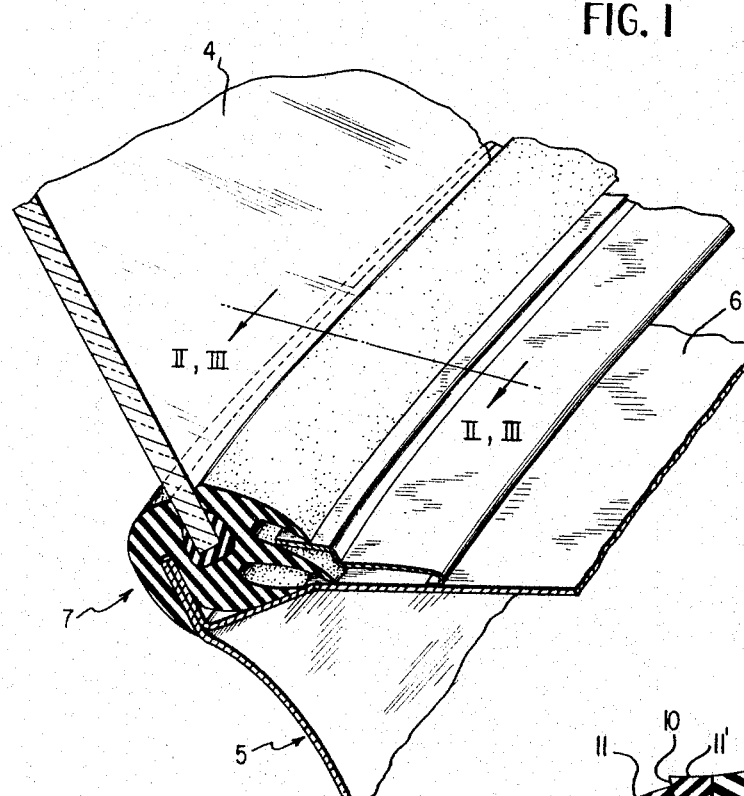

Aug. 1, 1967 K. STARK ETAL 3,333,381
SEALING STRIP
Filed April 20, 1964

INVENTORS.
KARL STARK
STEFAN BÄTZ

Dicke + Craig
BY
ATTORNEYS.

United States Patent Office 3,333,381
Patented Aug. 1, 1967

3,333,381
SEALING STRIP
Karl Stark and Stefan Bätz, Sindelfingen, Germany, assignors to Daimler-Benz Aktiengesellschaft, Unterturkheim, Germany
Filed Apr. 20, 1964, Ser. No. 360,972
3 Claims. (Cl. 52—403)

The present invention relates to a yieldable sealing strip intended for the installation of glass panes into a window opening, especially in motor vehicles, provided with a channel or groove for the accommodation of the rims of the windowpane. A good sealing effect is to be achieved by the strip in accordance with the present invention, particularly at those places which are bent or curved in adaptation to the form and contour of the window rims.

The known sealing strips of the prior art consist for the most part of an elastically yielding material whose softness is adjusted so as to correspond to the necessary form rigidity and insensitivity to weather and climate, but which is able to adapt itself to and closely follow only insufficiently the curved configuration of the pane. In another case, the prior art sealing strip does not offer sufficient support to the windowpane rim within the receiving groove thereof. Furthermore, a sealing strip is known into the receiving groove of which engages a pane whose rim is securely connected with a yielding strip. However, by reason of the total absence in connection with such prior art construction of any indication or specification for a different softness on the part of the two sealing materials, a safe seal is not assured by such prior art construction as well as the mutually separate manufacture of the two strips is also necessary therewith.

The further known two-layer sealing strips are unsuited for a windowpane but are normally usable only for doors or sliding windows and do not represent a secure permanent seal over the entire length of installation, but provides sealing only in certain positions of mutually relatively movable parts; additionally, such prior art strips do not exercise any support function for the glass pane.

In contradistinction thereto, with the double-layer sealing strip constructed as an installation profile member, the sections which receive the rims of the glass pane, especially the walls of the receiving groove for the windowpanes, consist in accordance with the present invention of a softer material than the remaining sections of the sealing strip whereby the two layers of different softness are intimately connected with each other already during the manufacture of the sealing strip, preferably by continuously passing over into each other.

Accordingly, it is an object of the present invention to provide a sealing strip for the installation of glass panes in window openings, especially in motor vehicles, which eliminates by simple means, the shortcomings and drawbacks encountered with the prior art constructions.

Another object of the present invention resides in the provision of sealing strips for the installation of glass panes with curved rims which not only assure a good sealing effect, but also permit an excellent adaptation of the sealing strip to the shape and contour of the rims of the glass panes.

Still another object of the present invention resides in the provision of a sealing strip for windows in motor vehicles having curved rim portions which is not only extremely reliable in operation, but also capable of adapting and closely following any contour of the window rim.

Still a further object of the present invention resides in the provision of a sealing strip for the windows in motor vehicles which achieves the aforementioned objects while simultaneously providing good support for the window.

Another object of the present invention resides in the provision of a sealing strip for the installation of a glass pane in motor vehicles which assures a permanent and lasting seal along all the edges of the pane.

Figure 2:
Figure 3:
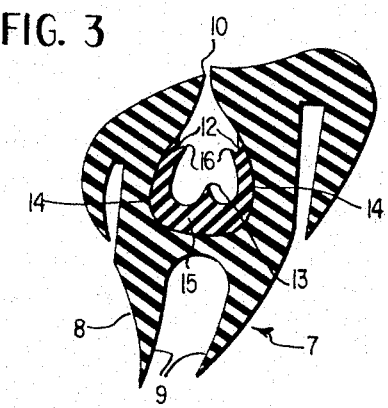

These and other objects, features and advantages of the present invention will become more obvious from the following description when taken in connection with the accompanying drawing which shows, for purposes of illustration only, two embodiments in accordance with the present invention, and wherein FIGURE 1 is a partial perspective view, partly in cross section, of a windshield pane installed into a motor vehicle by means of a sealing strip in accordance with the present invention;

FIGURE 2 is a cross sectional view taken along line II—II of FIGURE 1 through a first embodiment of a sealing strip in accordance with the present invention with the windowpane removed, and FIGURE 3 is a cross sectional view, similar to FIGURE 2, and taken along line III—III of FIGURE 1 through a modified embodiment of the sealing strip in accordance with the present invention, again with the windowpane removed.

Referring now to the drawing wherein like reference numerals are used throughout the various views to designate like parts, reference numeral 4 designates in FIGURE 1 the windshield pane which is inserted in or set into the forward section 5 of a motor vehicle above the cowl 6 by means of a sealing strip generally designated by reference numeral 7 and made of a yieldable material such as, for example, rubber. The sealing strip 7 has the usual cross sectional form. The receiving channel or groove 10 for the rims of the pane 4 is arranged in the sealing body 8, properly speaking, on the side thereof opposite the pair of sealing lips 9.

In contrast to the known constructions, the sealing strip 7 according to the present invention consists of layers of material having different softness. The main part of the strip cross section is made of a type of rubber of conventional and usual softness for such types of seal whereas the sections 11 and 11' (FIGURE 2) of the strip 7 forming the walls of the receiving channel 10 consist of a considerably more softly adjusted rubber. Both types of rubber are extruded together through one die and vulcanized in unison.

For the purpose of improving the seal, each of the substantially triangular shaped sections 11 and 11' are provided with a pocket 12 formed by two overlapping triangular cross-sectional shaped portions on the free sides thereof (FIGURE 2). The two-layer extruded sealing strip of the present invention has, in addition to the good property of the relatively harder main part to serve as support body, the advantage of providing pliant enclosure or framing walls for the rim of the pane and thus produces a completely satisfactory and unobjectionable seal.

The embodiment of the sealing strip generally designated by reference numeral 7 and illustrated in FIGURE 3 offers the same advantages. With this latter sealing strip, the bottom 13 and the lower parts 14 of the side walls of the receiving channel 10 consist of a relatively softly adjusted foam rubber with closed pores or of a very soft rubber layer 15 which is so adjusted that it still remains plastic within a certain measure even after vulcanization. The lateral wall parts 14 are provided at the upper ends thereof also with a type of pocket 12, the inwardly projecting rim of which extends into the groove or channel 10 as wedge-shaped lip 16 as in the embodiment of FIGURE 2.

While we have shown and described two embodiments in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:
1. A sealing strip for windowpanes, comprising a channel-shaped portion for receiving the rim of a windowpane, a sealing member attached to each side wall of said channel and having a substantially triangular cross-sectional shape with the base of the triangle disposed adjacent to the opening of said channel-shaped portion, whereby an opening is formed in said sealing strip which increases in width toward the bottom of said channel-shaped portion, and
said sealing members being of a softer material than said channel-shaped portion.

2. A sealing strip for windowpanes comprising, a channel-shaped portion for receiving the rim of a windowpane,
a sealing member attached to each side wall of said channel and having a substantially triangular cross-sectional shape with the base of the triangle disposed adjacent to, extending across, and closing the opening of said channel-shaped portion, whereby a cavity is formed in said sealing strip which increases in width toward the bottom of said channel-shaped portion, and
said sealing members being of a softer material than said channel-shaped portion.

3. A sealing strip for windowpanes comprising, a channel-shaped portion for receiving the rim of a windowpane,
a sealing member attached to each side wall of said channel-shaped portion comprising, a first part of substantially triangular cross-sectional shape with its base disposed adjacent to, extending across, and closing the opening of said channel-shaped portion, a second part having a substantially triangular cross-sectional shape overlapping said first part and disposed between said first part and the bottom of said side wall with its base extending substantially parallel to the base of said first part, whereby a cavity is formed in said sealing strip which generally increases in width toward the bottom of said channel-shaped portion, and said sealing members being of a softer material than said channel-shaped portion.

References Cited

UNITED STATES PATENTS

| | | | |
|---|---|---|---|
| 1,655,874 | 1/1928 | Nicholson | 20—69 |
| 2,121,827 | 6/1938 | Roberts | 20—69 |
| 2,203,522 | 6/1940 | Clark. | |
| 2,606,635 | 8/1952 | Clingman | 189—78 |
| 2,781,561 | 2/1957 | Gifford et al. | 20—69 |
| 3,009,216 | 11/1961 | Kimber | 20—56.4 |
| 3,029,481 | 4/1962 | Henniges | 20—69 |
| 3,177,534 | 4/1965 | Millhouse et al. | 20—69 |

FOREIGN PATENTS 678,819   9/1952   Great Britain.

DAVID J. WILLIAMOWSKY, *Primary Examiner.*

HARRISON R. MOSELEY, *Examiner.*

W. E. HEATON, *Assistant Examiner.*